(12) United States Patent
Yang

(10) Patent No.: US 7,682,277 B2
(45) Date of Patent: Mar. 23, 2010

(54) DUAL-DRIVE TRANSMISSION

(76) Inventor: Zhanguo Yang, No. 2-2-505, Lin Jiang Lane, Chang Jiang Road, Nankai District, Tianjin 300193 (CN)

( * ) Notice: Subject to any disclaimer, the term of this patent is extended or adjusted under 35 U.S.C. 154(b) by 0 days.

(21) Appl. No.: 12/355,766

(22) Filed: Jan. 17, 2009

(65) Prior Publication Data

US 2009/0124458 A1 May 14, 2009

Related U.S. Application Data

(63) Continuation of application No. PCT/CN2007/001921, filed on Jun. 19, 2007.

(30) Foreign Application Priority Data

Jul. 19, 2006 (CN) .................... 2006 2 0026765 U

(51) Int. Cl.
*F16H 37/08* (2006.01)
(52) U.S. Cl. ...................................... 475/198
(58) Field of Classification Search ............. 74/665 GC, 74/664; 475/18, 198, 206
See application file for complete search history.

(56) References Cited

U.S. PATENT DOCUMENTS 1,991,094 A * 2/1935 Higley ......................... 74/664
3,357,509 A * 12/1967 Gustafsson et al. ........ 180/6.44
4,428,445 A * 1/1984 Zaunberger ................. 180/6.44
5,386,742 A * 2/1995 Irikura et al. .............. 74/665 F
6,139,458 A * 10/2000 Simmons ..................... 475/83
7,028,801 B2 * 4/2006 Ima ............................ 180/244
7,491,147 B2 * 2/2009 Ross .......................... 475/225
2004/0087405 A1 * 5/2004 Inoue et al. ................. 475/206
2007/0072728 A1 * 3/2007 Ishimaru et al. ............ 475/206
2007/0270273 A1 * 11/2007 Fukuta et al. ............... 475/206

* cited by examiner

*Primary Examiner*—Dirk Wright
(74) *Attorney, Agent, or Firm*—Matthias Scholl P.C.; Matthias Scholl

(57) ABSTRACT

A dual-drive transmission, comprising a front shaft, a back shaft, a rear axle housing having a pair of half shafts, a central propeller shaft, a hub, and an electromagnetic splined clutch; a forestage gear is disposed on the central propeller shaft, a drive gear engaged with the forestage gear is disposed on the front shaft, a pair of one-way transmission gears is disposed one on each end of the central propeller shaft, a final drive gear is disposed on the hub, a driven gear engaged with the forestage gear is disposed on one end of the back shaft, and the electromagnetic splined clutch is axially connected to the back shaft.

16 Claims, 1 Drawing Sheet

DUAL-DRIVE TRANSMISSION

CROSS-REFERENCE TO RELATED APPLICATIONS

This application is a continuation of International Patent Application No. PCT/CN2007/001921 with an international filing date of Jun. 19, 2007, designating the United States, now pending, and further claims priority benefits to Chinese Patent Application No. 200620026765.3 filed Jul. 19, 2006. The contents of all of the aforementioned applications, including any intervening amendments thereto, are incorporated herein by reference.

BACKGROUND OF THE INVENTION

1. Field of the Invention

The invention relates to a vehicle transmission, and particularly to a dual-drive transmission.

2. Description of the Related Art

The need for a transmission in an automobile is a consequence of the characteristics of the internal combustion engine. Engines typically operate over a range of 600 to about 7000 revolutions per minute, while the car's wheels rotate between 0 rpm and around 1800 rpm.

Furthermore, the engine provides its highest torque outputs approximately in the middle of its range, while often the greatest torque is required when the vehicle is moving from rest or traveling slowly. Therefore, a system that transforms the engine's output so that it can supply high torque at low speeds, but also operate at highway speeds with the motor still operating within its limits, is required. Transmissions perform this transformation.

As vehicles travel downhill, they usually coast, i.e., their engines are in gear and operate at idle speeds to reduce fuel consumption yet at the same time controlling vehicle velocity. However, resistance generated by the engines operating at idle speeds also significantly affects the coasting distance. In addition, as the engine operates at idle speeds, the speed of the vehicle cannot be controlled by the engine, and in essence the transmission is "single drive".

CN Patent 2224116 discloses an axle shaft clutch for a driving wheel, which implements centrifugal separation during high-speed traveling of vehicles, so as to increase coasting distance after an engine retards the throttle. However, disadvantages of the axle shaft clutch include the following:

1. Centrifugal separation cannot be implemented at low-speeds, and thus coasting distance is not increased at low speeds;
2. The traveling speed cannot be controlled as the vehicle coasts downhill and the engine operates at an idle speed, and thus security is not ensured; and
3. The axle shaft clutch operating in a free state at a critical speed affects stability of the vehicle and increases operating noise.

SUMMARY OF THE INVENTION

In view of the above-described problems, it is an objective of the invention to provide a dual-drive transmission that prevents resistance formed by an engine operating at an idle speed, has no effect on coasting distance of the vehicle and implements a so-called "double drive".

In order to achieve the above objectives, in accordance with one embodiment of the invention, provided is a dual-drive transmission, comprising a front shaft, a back shaft, a rear axle housing having a pair of half shafts, a central propeller shaft, a hub and an electromagnetic splined clutch; wherein a forestage gear is disposed on the central propeller shaft, a drive gear engaged with the forestage gear is disposed on the front shaft, a pair of one-way transmission gears are disposed on both ends of the central propeller shaft, a final drive gear is dispose on the hub, a driven gear engaged with the forestage gear is disposed on one end of the back shaft, and the electromagnetic splined clutch is axially connected to the back shaft.

In a class of this embodiment or in another embodiment, a control switch of the electromagnetic splined clutch is disposed on a gear lever in a cab.

In a class of this embodiment or in another embodiment, a backing control switch parallel to the control switch of the electromagnetic splined clutch is disposed on the gear lever in the cab.

In a class of this embodiment or in another embodiment, the one-way transmission gear comprises an overrunning clutch and a middle gear.

In a class of this embodiment or in another embodiment, the middle gear is disposed on an outer ring of the overrunning clutch.

In a class of this embodiment or in another embodiment, the middle gear is engaged with the final drive gear via a reversing gear.

In a class of this embodiment or in another embodiment, the central propeller shaft is disposed on an inner ring of the overrunning clutch.

In a class of this embodiment or in another embodiment, a pair of gear boxes is connected one to each end of said rear axle housing.

In a class of this embodiment or in another embodiment, the gear box operates to receive and/or support the middle gear, the reversing gear and the final drive gear.

In a class of this embodiment or in another embodiment, a middle axle housing is connected between the gear box.

In a class of this embodiment or in another embodiment, the middle axle housing operates to receive the central propeller shaft, the forestage gear, the drive gear and the driven gear.

In a class of this embodiment or in another embodiment, a back bearing box is disposed between the rear axle housing and the middle axle housing.

In a class of this embodiment or in another embodiment, the back bearing box operates to receive the back shaft and the electromagnetic splined clutch.

In a class of this embodiment or in another embodiment, as the vehicle moves in reverse, the gear lever enables the backing control switch, and the electromagnetic splined clutch connects the front shaft and the back shaft, so as to provide power to a driving wheel so that it can rotate reversely.

Advantages of the invention include:

(a) as a driving wheel on one side operates in idle, the other driving wheel is capable of driving the vehicle forward;
(b) the one-way transmission gear prevents resistance formed by an engine operating at an idle speed, and thus reduces fuel consumption; and
(c) as the vehicle coasts downhill or retards the throttle, the back shaft is connected to the front shaft via the electromagnetic splined clutch, and the resistance formed by the engine operating at an idle speed controls the vehicle speed (lowers the vehicle speed) and thus ensures traffic safety.

DETAILED DESCRIPTION OF THE INVENTION

Figure 1:
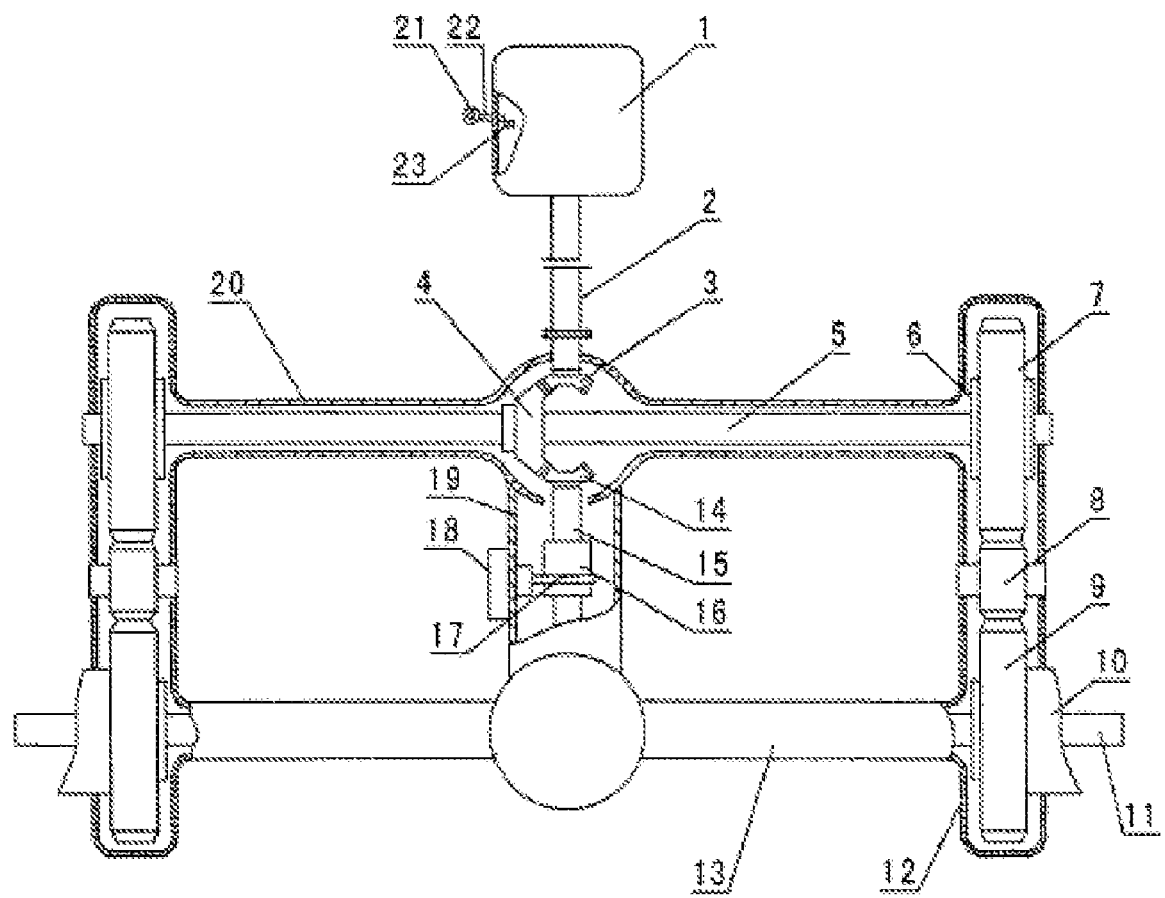
FIG. 1 is a schematic view of a dual-drive transmission of an exemplary embodiment of the invention.

Detailed description will be given below with reference to accompanying drawings.

1. Structure

As shown in FIG. 1, a dual-drive transmission of the invention comprises a front shaft 2, a back shaft 15, a rear axle housing 13 having a pair of half shafts 11, a central propeller shaft 5, a hub 10 and an electromagnetic splined clutch 16.

A forestage gear 4 is disposed on the central propeller shaft 5. A drive gear 3 engaged with the forestage gear 4 is disposed on the front shaft 2. A pair of one-way transmission gears is disposed one at each end of the central propeller shaft 5, each transmission gear comprising an overrunning clutch 6 and a middle gear 7.

A final drive gear 9 is disposed on the hub. A driven gear 14 engaged with the forestage gear 4 is disposed on one end of the back shaft 15.

The middle gear 7 is disposed on an outer ring of the overrunning clutch 6 and is engaged with the final drive gear 9 via a reversing gear 8.

The central propeller shaft 5 is disposed on the inner ring of the overrunning clutch 6.

The electromagnetic splined clutch 16 is axially connected to the back shaft 15, and comprises a fork-lever 17 and an electromagnetic control box 18 operating to control the fork-lever 17.

A control switch 21 of the electromagnetic splined clutch 16 is disposed on a gear lever 22 in a cab.

A backing control switch 23 parallel to the control switch 21 of the electromagnetic splined clutch 16 is disposed on the gear lever 22 in the cab.

A pair of gear boxes 12 is connected one to each end of the rear axle housing 13, and operates to receive and/or support the middle gear 7, the reversing gear 8 and the final drive gear 9.

A middle axle housing 20 is connected between the gear boxes 12, and operates to receive the central propeller shaft 5, the forestage gear 4, the drive gear 3 and the driven gear 14.

A back bearing box 19 is disposed between the rear axle housing 13 and the middle axle housing 20, and operates to receive the back shaft 15 and the electromagnetic splined clutch 16.

2. Operation

As the engine retards the throttle, the overrunning clutches 6 automatically disconnect the middle gears 7 from the central propeller shaft 5 without changing gears or disconnecting the clutch, thus conserving energy; at this time the central propeller shaft 5 reduces speed, and the middle gears 7 keep operating at high speed. For comparison, in conventional transmission, as the engine retards the throttle, since the engine, the gearbox and the differential gear are connected, resistance is formed while the engine continues operating, which increases oil consumption.

As the vehicle coasts downhill or retards the throttle, the back shaft is connected to the front shaft via the electromagnetic splined clutch, and the resistance formed by the engine operating at an idle speed controls the car speed and thus ensures traffic safety As the vehicle moves in reverse, the gear lever 22 enables the backing control switch 23, and the electromagnetic splined clutch 16 connects the front shaft 2 and the back shaft 15, so as to provide power to a driving wheel so that it can rotate reversely.

This invention is not to be limited to the specific embodiments disclosed herein and modifications for various applications and other embodiments are intended to be included within the scope of the appended claims. For example, the transmission can be used for both a 2WD and a 4WD vehicle. When applied to a 4WD vehicle, a separate transmission needs to be added to the front bridge.

While this invention has been described in connection with particular examples thereof, the true scope of the invention should not be so limited since other modifications will become apparent to the skilled practitioner upon a study of the drawings, specification, and following claims.

The invention claimed is:

1. A transmission, comprising
   a front shaft;
   a back shaft;
   a rear axle housing having a pair of half shafts;
   a central propeller shaft;
   a hub; and
   an electromagnetic splined clutch;
wherein
   a forestage gear is disposed on said central propeller shaft;
   a drive gear engaged with said forestage gear is disposed on said front shaft;
   a pair of one-way transmission gears are disposed on both ends of said central propeller shaft;
   a final drive gear is disposed on said hub;
   a driven gear engaged with said forestage gear is disposed on one end of said back shaft; and
   said electromagnetic splined clutch is axially connected to said back shaft.

2. The transmission of claim 1, wherein a control switch of said electromagnetic splined clutch is disposed on a gear lever in a cab.

3. The transmission of claim 1, wherein a backing control switch parallel to said control switch of said electromagnetic splined clutch is disposed on said gear lever in the cab.

4. The transmission of claim 1, wherein said one-way transmission gear comprises an overrunning clutch and a middle gear.

5. The transmission of claim 4, wherein said middle gear is disposed on an outer ring of said overrunning clutch.

6. The transmission of claim 4, wherein said middle gear is engaged with said final drive gear via a reversing gear.

7. The transmission of claim 1, wherein said central propeller shaft is disposed on an inner ring of said overrunning clutch.

8. The transmission of claim 1, wherein a pair of gear boxes is connected one to each end of said rear axle housing.

9. The transmission of claim 8, wherein said gear box operates to receive and/or support said middle gear, said reversing gear and said final drive gear.

10. The transmission of claim 9, wherein a middle axle housing is connected between said gear box.

11. The transmission of claim 10, wherein said middle axle housing operates to receive said central propeller shaft, said forestage gear, said drive gear and said driven gear.

12. The transmission of claim 1, wherein a back bearing box is disposed between said rear axle housing and said middle axle housing.

13. The transmission of claim 12, wherein said back bearing box operates to receive said back shaft and said electromagnetic splined clutch.

14. A transmission for a motor vehicle, comprising:
a front shaft;
a back shaft;
a clutch;
a central propeller shaft;
a pair of overrunning clutches;
a pair of middle gears;
a pair of reversing gears;
a pair of final drive gears; and
a rear axle comprising a pair of half shafts;
wherein
the front shaft is connected to an engine via a gear box;
the front shaft is connected to the central propeller shaft via a drive gear and a forestage gear;
the front shaft is connected to the back shaft via the clutch;
the back shaft is connected to the real axle;
the middle gears are connected one to each end of the central propeller shaft each via an overrunning clutch;
each middle gear is connected to a reversing gear;
each reversing gear is connected to a final drive gear; and
the final drive gears are connected each to one of the half shafts.

15. The transmission of claim 14, wherein said overrunning clutch is a one-way clutch which transfers force from said central propeller shaft onto said middle gear but does not transfer force from said middle gear onto said central propeller shaft.

16. A method of controlling speed of a motor vehicle comprising the transmission of claim 14, wherein when the vehicle is coasting downhill or retards the throttle, the back shaft is connected to the front shaft via said clutch whereby resistance formed by an engine operating at an idle speed controls the motor vehicle speed.

* * * * *